July 17, 1934.  H. LUND  1,966,764
AUTOMOBILE GUIDE LIGHT
Filed Oct. 24, 1931
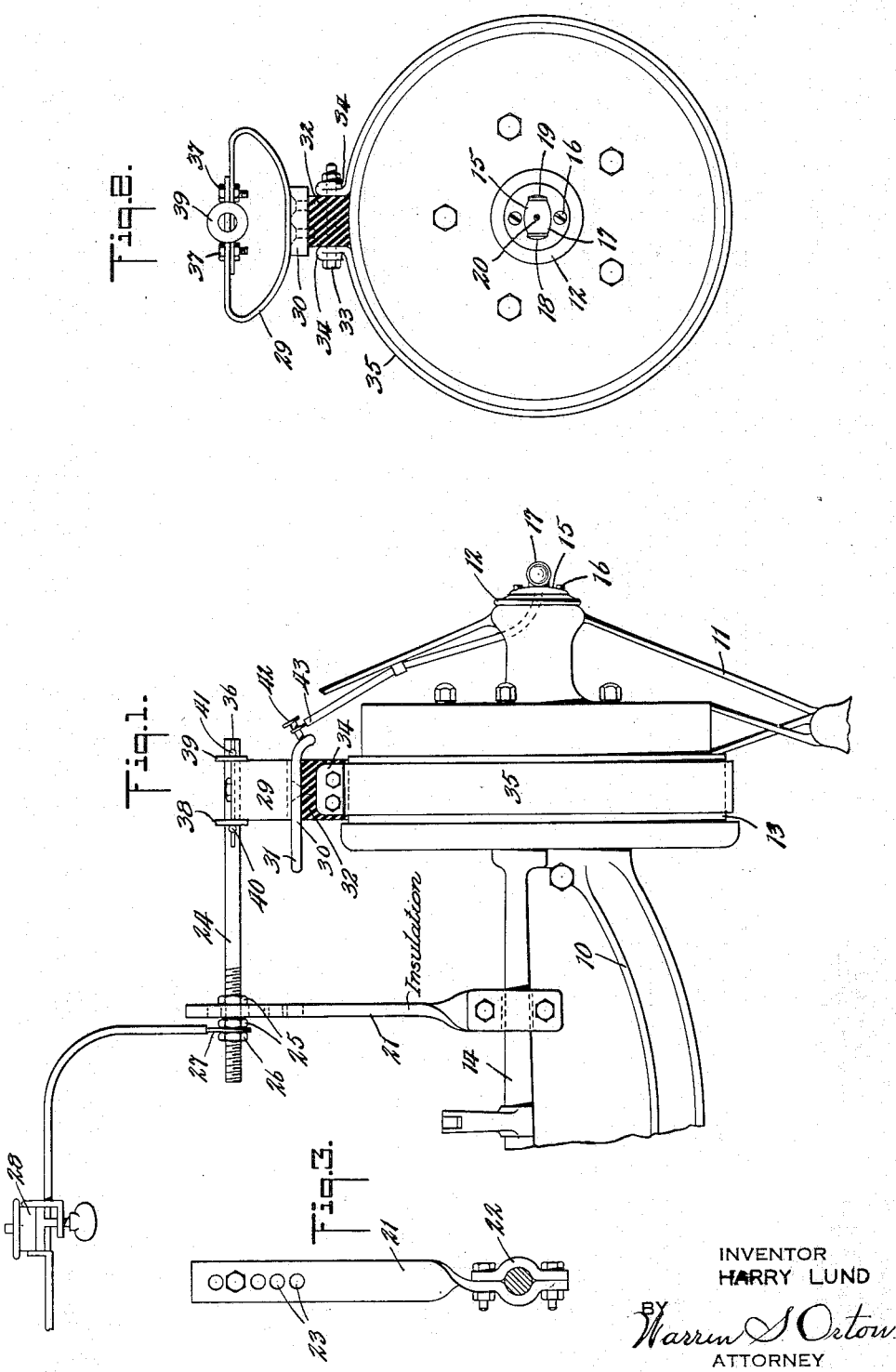
INVENTOR
HARRY LUND
BY
Warren S Orton
ATTORNEY Patented July 17, 1934

1,966,764

UNITED STATES PATENT OFFICE 1,966,764

AUTOMOBILE GUIDE LIGHT

Harry Lund, East Orange, N. J.

Application October 24, 1931, Serial No. 570,859

7 Claims. (Cl. 240—8.12)

The invention relates in general to guide light constructions of the type where a light is mounted on the front forward hub of an automotive vehicle to indicate to the driver of an oncoming car the location of the left forward wheel of the vehicle provided with the guide light of the type herein featured.

It has been known heretofore to illuminate the left forward wheel of an automotive vehicle but such general illumination of the wheel is not particularly noticeable to the oncoming driver, particularly in the presence of strong head lights which by contrast are quite apt to dim any such illuminated wheel.

The primary object of the present invention is to provide a form of guide light for the front left forward wheel which will be notice-compelling and which will positively attract the attention of the oncoming driver and indicate the location of the wheel or rather the hub cap of the wheel even in the presence of strong head lights on either or both cars. Broadly, this object is attained by the providing of a beam light in place of the known form of flooding light; the directing of the beam forwardly of the direction of travel of the vehicle and finally by causing the beam to flash intermittently and preferably in timed sequence with the rotation of the wheel to cause the beam to be maintained over a relatively short arc of movement and while being directed forward.

Another object of the invention is to provide a locating or guiding light construction of the type outlined which can be readily mounted on vehicles of different makes and sizes without necessity of changing or modifying any of the existing structural parts and preferably to provide a form of attachment which can be readily mounted in position and with the parts adjusted for co-operative operation without necessity of using any more tools than are found in the usual automobile kit.

Various other objects and advantages of the invention will be in part obvious from an inspection of the accompanying drawing and in part will be more fully set forth in the following particular description of one form of mechanism embodying the invention, and the invention also consists in certain new and novel features of construction and combination of parts hereinafter set forth and claimed.

In the accompanying drawing:

Fig. 1 is a fragmentary view of the front wheel assembly of an automotive vehicle with a preferred embodiment of the invention mounted thereon;

Fig. 2 is a view in side elevation of the construction shown in Fig. 1 with parts omitted; and Fig. 3 is a view in side elevation of the supporting bracket engaging the brake rod tube.

Referring to the drawing there is shown a structural part 10 of an automobile including the left forward wheel 11 provided with its usual hub cap 12. There is also disclosed a drum cover 13 rotating with the wheel and its associated brake rod tube 14. It is intended that the construction thus far described is to represent any conventional form of automotive vehicle, in the instant case, the showing being that of a wire wheel 11, but it is obviously within the scope of the disclosure to mount the attachment hereinafter described on a wooden, disc or other conventional form of wheel, with obvious changes in the illustrated structure to accommodate it to the different forms of wheel.

Mounted on the hub cap 12 is a lamp 15 demountably secured by bolts 16 but it is within the scope of the disclosure to solder or otherwise secure the lamp in position, preferably in such way as will maintain the cap closed in its usual capacity to prevent leakage of grease from or through the wheel. It is also a feature of the present disclosure to provide the lamp of the least possible dimensions so as to prevent any undue elongation of the hub cap and thus minimize the possibility of the lamp being torn away from the wheel by side-swiping action of another vehicle. The lamp is designed so as to throw a beam of light in a plane parallel to the plane of the wheel there being no intent in this device to illuminate the wheel, but, on the contrary, to maintain the beam as a small pencil of light. In the device illustrated, the lamp includes an open end barrel 17 with opposite ends closed by lenses 18 and 19 and with a source of illumination 20 located centrally in the casing. This construction is designed to direct a beam of light both forwardly and rearwardly of the vehicle but in those cases where it is desired to utilize only one beam, it is herein suggested that a reflecting mirror be substituted for whichever of the lens forms the rearwardly directed light.

The attachment also includes an upstanding bar constituting a bracket 21 with its lower end bent and coacting with a strap 22 bolted thereto for encircling the brake rod tube 14 to which it is firmly connected. The bracket 21 is formed of insulating material or is conventionally insulated from the brake rod tube 14. The upper end of the bracket 21 is provided with a plurality of apertures 23 selectively positioned in one of which is a rod 24 of electric conducting material and secured in adjusted position to the bracket 21 by means of nuts 25 threaded to the rod 24 and screwed into snug engagement with opposite sides of the bracket 21. One of the nuts 25 coacts with another nut 26 to retain therebetween an end of an electric lead 27 constituting part of a light circuit for supplying the source of light 20 in lamp 15 and which circuit also includes a manually actuated circuit closer 28 constituting the main control switch and which is preferably in the form of a snap switch mounted on the dash board of the vehicle. The arm 24 is disposed to overlap the drum cover 13, the vertical adjustment provided by the apertures 23 and the horizontal adjustment provided by the threaded portion of the rod 24 insures the proper location of a spring contact 29 carried by the outer end of the rod in its relation to a co-acting contact 30 carried by the drum cover. The contacts 29 and 30 form an intermittently actuated make-and-brake circuit closer for causing the lamp to intermittently flash and preferably the parts are so disposed that the contact elements are in circuit closing position in timed relation to direct the beam of light horizontally forward at that instant of time when the lamp is rotated with the wheel into position to so direct the beam of light. The contact 30 is in the form of a brass plate 31 having a transverse length, that is, a length considered axially of the wheel, as shown in Fig. 1, sufficient to maintain the contact even when the wheel is turned at one angle to its normal forward direction of travel in the act of steering the vehicle. The plate 31 also has sufficient length considered circumferentially of the wheel as shown in Fig. 2 so as to insure the completion of the circuit through the lamp and the maintaining of the lamp lit for a prescribed period of time even under those conditions where the vehicle is traveling at high speed with resulting high velocity of the vehicle wheel and short duration of contact. The contact plate 31 is mounted on an insulating fibre block 32 which is clamped by bolts 33 between the radially outturned ends 34 of a steel band 35 constituting a contact mounting and designed to grip the drum cover 13 and to turn therewith as the wheel 11 rotates. The fibre block 32 insulates the contact plate 31 from the mounting band 35 and the associated parts of the brake drum. The relatively fixed circuit closer contact element 29 is resilient and in the form illustrated constitutes a closed spring loop, the ends of which are passed through a slot 36 in the end of the rod 24 and secured by nuts 37. Washers 38 and 39 are positioned to prevent movement of the contact 29 lengthwise of its carrying rod 24 and are held against sliding movement on the rod 24 by pins 40 and 41.

The lamp circuit includes a suitable source of electric energy (not shown) grounded on one side and connected electrically to the main control switch 28. From the switch electric current is conveyed through lead 27, rod 24, intermittently closed circuit closer formed by contacts 29—30, and from a contact post 42 on the outer end of plate 31 through lead 43 to the source of light 20 in the lamp 15 from which it is provided.

In operation, it will be understood that when the main switch 28 is disposed in position to close the circuit up to the intermittently actuated circuit closer the rotation of the wheel at each 360° of rotation of the movable contact 30 will bring the contact plate 31 into engagement with the curved underside of contact 29 slightly distorting the same and the reactory resiliency of the spring loop will maintain contact with the plate 31 thus causing the lamp to direct therefrom a small beam of light. This will continue until the movable contact 29 has passed beyond the spring loop, thus intercepting the circuit through the lamp and causing the lamp to become extinguished for a period of time until the revolving contact is again brought by the turning of the wheel into engagement to cause a succeeding functioning of the guide light. The faster the car is moving, the more rapidly will the lamp flash so that the rapidity of flashes will also indicate the speed of the oncoming vehicle and the direction of the beam relative to the direction of the beam from the headlights on the body of the car will indicate whether the oncoming car is turning or about to turn one way or the other.

By means of a device of the class described, it is possible to provide a simple form of attachment which may be installed on any of the makes of automobiles now in general use and with little, if any, mutilation or change in the conventional, structural parts of these known forms of automobiles. The parts can be readily adjusted to fit the different forms of automobiles and when once adjusted the device requires no further attention excepting occasional replacement of bulbs, when they become exhausted.

I claim:

1. In a device of the class described, the combination with certain parts of an automotive vehicle, including the left front wheel complete with its conventional hub cap and also including its associated drum cover and a brake rod tube, of a signalling attachment for the vehicle comprising a beam producing lamp, means for securing the same to the hub cap to rotate therewith, a contact mounting band secured to the drum cover to rotate therewith, and a bracket fixedly secured to the brake rod tube and means including said lamp forming a lamp circuit, said means also including a circuit closer comprising a contact element secured to the mounting band to rotate therewith and insulated therefrom, a coacting element of said circuit closer carried by the bracket, disposed in the path of revolving movement of the first named contact element and disposed to close the circuit intermittently through the lamp and thus cause the lamp to flash at each rotation of the wheel.

2. In a device of the class described, the combination with a vehicle including a wheel provided with a hub cap and with a part rotating therewith and a fixed structural part adjacent the wheel, of an attachment comprising a bracket fixedly secured to the structural part, a beam producing lamp secured to the hub cap to rotate therewith, and means including said lamp forming a lamp circuit, said means including a rod of conducting material, a circuit closer including a spring contact element carried by the rod and electrically connected to the same, a coacting contact element secured to the part rotating with the wheel, insulated therefrom and disposed in the path of revolving movement of the first named contact whereby the lamp is caused to flash at each rotation of the wheel, said lamp disposed on the cap to direct its beam in a horizontal direction at each flash.

3. In a device of the class described, the combination with a vehicle including a wheel provided with a hub cap and with a part rotating therewith and a fixed structural part adjacent the wheel, of an attachment comprising a bracket fixedly secured to the structural part, a beam producing lamp secured to the hub cap to rotate therewith about a contained axis, and means including a spring contact element carried by the rod and electrically connected to the same, a coacting contact element secured to the part rotating with the wheel, insulated therefrom and disposed in the path of revolving movement of the first named contact whereby the lamp is caused to flash at each rotation of the wheel and said rod and bracket provided with means coacting to accommodate the attachment to wheels of different dimensions and thus to locate the contacts in operative position on different makes of vehicles to cause the beam to flash when the lamp is in a preset position in its rotary movement.

4. An attachment for a vehicle wheel comprising a mounting band adapted to be located on the wheel of an automotive vehicle to rotate therewith, means for clamping the band in adjusted position on the wheel without insulating the wheel, means forming a light circuit including a lamp and a controlling circuit closer, means for securing the lamp to the vehicle wheel to rotate therewith, one element of the circuit closer carried by the mounting band adjustable therewith into a position fixed relative to the wheel and revolvable about a closed path of movement, a bracket provided with means for securing the same in fixed position adjacent the wheel, a rod of conducting material carried by the bracket, a coacting element of the circuit closer carried by the rod and held thereby in said path of movement, one of said contact elements being resilient to permit one of the contacts to wipe the other contact and said bracket and rod provided with means coacting to provide relative adjustment and thus permit the locating of the element carried by the rod in proper position to be engaged by the movable contact and said circuit including a lead connected electrically to said rod and a lead electrically connecting the lamp with the contact element carried by the mounting band.

5. An attachment for a vehicle wheel comprising a mounting band adapted to be secured to the wheel of an automotive vehicle to rotate therewith and having radially outturned ends, an insulating block secured between said outlined ends, means forming a light circuit including a lamp and a controlling circuit closer, one element of the circuit closer carried by the insulating block and revolvable about a closed path of movement, a bracket provided with means for securing the same in fixed position adjacent the wheel, a rod carried by the bracket, a coacting element of the circuit closer carried by the rod and held thereby in said path of movement, one of said contact elements being resilient to permit one of the contacts to pass the other contact and said bracket and rod provided with means coacting to provide relative adjustment and thus permit the locating of the element carried by the rod in proper position to be engaged by the movable contact.

6. In a device of the class described, the combination of a front left wheel of a vehicle including its hub cap for closing the outer end of its hub, and a fixed structural part of the vehicle, means forming an electric circuit, said means including a flash lamp comprising an open end barrel secured at its midlength to the hub cap and provided with beam forming lines at opposite ends, two circuit closers for controlling the circuit, one of said circuit closers constituting a main manually actuated switch and the other constituting a make-and-brake circuit closer with one of its contact elements being resilient and providing a duration of engagement between the elements sufficient to permit the lamp to light and throw a beam in opposite directions, even when the vehicle is travelling at high speed, said circuit closer contacts being arranged relative to the rotary movement of the wheel to cause the beam always to form in a horizontal direction.

7. A vehicle lighting device comprising an attachment for a vehicle comprising an annular mounting band adapted to encircle the drum cover of an automobile vehicle wheel, means forming a lighting circuit including an electrically actuated light directing device, a movable element of a wiping circuit closer carried by the band, means for securing the band and element in circumferentially adjusted position on the drum cover, a bracket provided with means for demountably securing the same to a fixed structural part of the vehicle, a rod carried by the bracket, a coacting element of the circuit closer carried by the rod and at all times disposed in the path of movement of the movable element, said bracket and rod provided with means coacting to provide relative adjustment and thus permit the locating of the element carried by the rod in proper position to be engaged by the movable element.

HARRY LUND.